(12) United States Patent
Takahashi

(10) Patent No.: US 6,758,476 B2
(45) Date of Patent: Jul. 6, 2004

(54) MECHANICAL SEAL DEVICE

(75) Inventor: Hidekazu Takahashi, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/304,692

(22) Filed: Nov. 27, 2002

(65) Prior Publication Data
US 2003/0102631 A1 Jun. 5, 2003

(30) Foreign Application Priority Data

Nov. 30, 2001 (JP) .................................. 2001-366325

(51) Int. Cl.$^7$ ............................................ F16J 15/34
(52) U.S. Cl. ................................. 277/370; 277/377
(58) Field of Search ......................... 277/377, 385, 277/370, 371, 375, 379

(56) References Cited

U.S. PATENT DOCUMENTS

| | | | |
|---|---|---|---|
| 5,188,377 A | | 2/1993 | Drumm |
| 5,199,720 A | | 4/1993 | Radosav et al. |
| 5,275,421 A | * | 1/1994 | Hornsby ..................... 277/370 |
| 5,354,070 A | * | 10/1994 | Carmody .................... 277/370 |
| 5,571,268 A | * | 11/1996 | Azibert ....................... 277/382 |
| 5,863,047 A | * | 1/1999 | Ellis ............................ 277/374 |
| 5,913,520 A | | 6/1999 | Clark et al. |
| 6,457,720 B1 | * | 10/2002 | London ....................... 277/370 |
| 6,485,024 B1 | * | 11/2002 | Pippert et al. .............. 277/370 |
| 6,550,779 B2 | * | 4/2003 | Bjornson .................... 277/370 |
| 6,561,515 B1 | * | 5/2003 | Bjornson .................... 277/358 |
| 2002/0089123 A1 | * | 7/2002 | Azibert ....................... 277/370 |

FOREIGN PATENT DOCUMENTS

| | | |
|---|---|---|
| DE | 1 101 882 | 3/1961 |
| DE | 1 269 852 | 6/1968 |

* cited by examiner

Primary Examiner—William L. Miller
(74) Attorney, Agent, or Firm—Arent Fox PLLC

(57) ABSTRACT

The structure of the entire mechanical device is simplified as an outside seal. The mechanical sealing device includes a two-half stationary seal ring having a first sealing face at one end and retained fluid-tightly by the housing so as to be movable axially, and a first two-half fastening ring fitting to the outer face of the two-half stationary seal ring and closely contacting the splitting faces of the two-half stationary seal ring. The axial splitting faces of the first two-half fastening ring are coupled. A gap through which the sealed fluid passes is defined between the inner face of the two-half stationary seal ring and the rotational shaft. The two-half stationary seal ring is elastically biased against the two-half rotational seal ring.

5 Claims, 4 Drawing Sheets

MECHANICAL SEAL DEVICE

BACKGROUND OF THE INVENTION

1. Field of the Invention

This invention relates to a two-half type mechanical seal device comprising two halves each having a splitting face extending axially that are combined from the radial direction of a rotational shaft to couple together, and more particularly to a two-half type mechanical seal device constituted as an outside seal device for sealing a high pressure fluid.

2. Description of the Related Art

As a first related art relating to the invention there exists a mechanical seal device, as shown in FIG. 3.

FIG. 3 is a sectional view, showing the upper half of a mechanical seal device 100 according to the first related art. The mechanical seal device 100 is an inside seal device. A rotational shaft 148 passes through a passage 151 in the housing 150 to which the mechanical seal device 100 is mounted. To the end face of the housing 150 is secured a gland assembly 140 with screw bolts (not shown) through a gasket. The gland assembly 140 is also comprised of two halves that are split along the axial plane. In the gland assembly 140, those two halves are joined together at their mating faces with a plurality of screw bolts (not shown).

A mechanical seal is disposed inside of the inner face 141 of the gland assembly 140. Tis mechanical seal is provided with a holder assembly 102 that is also comprised of two halves and mounted on the rotational shaft 148 for rotation therewith. The two halves of the holder assembly 102 are joined together at their splitting faces with a plurality of screw bolts. Between the outer face of the holder assembly 102 and the inner face 141 of the gland assembly 140 is formed a fluid passage 142 through which the sealed fluid flows. Further, a first O-ring 131 for sealing the fitting section between the rotational shaft 148 and the holder assembly 102 is fitted in an annular groove 105 formed in the inner face of the holder assembly 102.

At one end face of the holder assembly 102 is formed a recess 146 having a bottom surface to which one or more drive pins 135 are fixed and having a step section 145 on which an O-ring is seated.

Within the recess 146 of the holder assembly 102 is installed a rotational seal ring 101 that is also comprised of two halves that are split in the axial direction. The rotational seal ring 101 has a rotational sealing face 106 at one end and one or more engagement sinks 103 at the other end for the engagement with the corresponding drive pins 135. Between the step section 145 of the holder assembly 102 and the outer face of the rotational seal ring 101 is provided a space 133 in which a second O-ring 132 is disposed. The second O-ring 132 is adapted to fasten the splitting faces to closely contact the two halves of the rotational seal ring 101 and adapted to seal the space 133. An inlet 144 is also formed to allow the sealed fluid to enter the space 133.

An axial two-half type stationary seal ring 110 having a stationary sealing face 111 in close contact with the rotational sealing face 106 is fitted to the rotational shaft 148 with a gap therebetween. The stationary seal ring 110 is disposed within the space defined by the inner space defining face 143 of the gland assembly 140 and is movably fitted to a fitting surface S. The stationary seal ring 110 is biased toward the rotational seal ring 102 by a plurality of leaf springs 130 mounted at the end of the gland assembly 140. Further, a space chamber 114 is formed between the outer face of the stationary seal ring 110 and the inner space defining face 143. A third O-ring 137 is provided in the space chamber 114. The third O-ring 137 is adapted to fasten the mating surfaces to closely contact the two halves of the stationary seal ring 110 and adapted to seal the space chamber 114.

In the mechanical seal device 100 of the first related art constituted in such a way described, it is required to provide the two-half type gland assembly 140 in which a mechanical seal is build. The gland assembly 140 necessarily has a complicated structure due to its two-half constitution in which the two halves are assembled with screw bolts and due to the attachment of the gland assembly 140 to the end face of the housing 150 with screw bolts. Accordingly, there is a problem that the gland assembly 140 becomes larger in size. Also, the two-half type holder assembly 102 assembled with screw bolts has a complicated structure and a large size because it contains the rotational seal ring 101. The large size of the holder assembly 102 makes the mechanical seal device larger in its overall size. The higher the pressure of the fluid to be sealed is, the larger the thickness required for the components of the gland assembly 140 becomes, causing the entire structure to be large in size.

A plurality of leaf springs 130 circumferentially located at the end of the gland assembly 140 make the structure further complicated. There is also a problem that it becomes more difficult to fabricate the entire seal device because of the increase of the total number of parts.

Further, when the pressure of the sealed fluid is high, the high pressure fluid from the fluid passage 142 acts on the second O-ring 132 and the third O-ring 137. This causes the deformable seal rings 101 and 110 of silicon carbide or carbon of the split structure to be easily deformed by the pressure of the sealed fluid and as a result, the sealing faces 106 and 111, specifically the rotational sealing face 106 is deformed, which leads the sealed fluid to leak between the sealing faces 106 and 111.

Further, there exists a two-half type, outside mechanical seal device 200 as a second related art, as shown in FIG. 4.

In FIG. 4, the two-half mechanical seal device 200 is provided for sealing the sealed fluid between a rotational shaft 148 and a housing 150 through which the rotational shaft 148 passes. The fluid is sealed by a stationary sealing face 161 through the inner face side of a stationary seal ring 160.

The axial two-half type stationary seal ring 160 for sealing the fluid on its inner face side has an inner face fitted to the rotational shaft 148 with a gap therebetween. This gap formed between the inner face of the stationary seal ring 160 and the outer face of the rotational shaft 148 defines a fluid passage for the sealed fluid.

The stationary seal ring 160 has an outer face fitting to the inner face 167 on one side of an annular gasket 165 comprised of combined two thick halves each having the L shaped sectional area. The end face 166 on the other side of the gasket 165 is in close contact with the end face of the housing 150. The gasket 165 is also split into two halves. Those two halves can be in close contact with each other in a way that projections and recesses formed on the splitting faces of two halves are closely fitted to each other.

The stationary seal ring 160 is secured through the gasket 165 to the inner face 167 on one side of an axial two-half type stationary holder 168, the other end of which is fitted and secured to the projection formed in one end of the housing 150. In order to assemble the stationary two-half type holder 168, two halves of the two-half stationary holder 168 are fastened with two screw bolts 153 and coupled together.

In the two-half stationary holder 168, in order to compensate for holding the stationary seal ring 160 fittingly secured on other side while one end is fittingly secured to the projection of the housing 150, one of the fitting sections has a recess or undercut. In this recess structure, the part of the gasket 165 sandwiched by the two-half holder 168 and the stationary seal ring 160 is made thick.

The two-half type rotational seal ring 170 is fitted to the rotational shaft 148 with a gap therebetween and has at one end a rotational sealing face 171 in close contact with the stationary sealing face 161 to seal the fluid. The outer face of the rotational seal ring 170 is fitted to the inner face 177 of a second gasket 175 and secured through the gasket 175 to a two-half type rotational holder 178. The gasket 175 is also split into two halves. Those two halves engage with each other in a way that projections and recesses formed on the splitting faces of two halves are fitted to each other.

The two-half type rotational holder 178 is comprised of two halves split in the axial direction and couples to the rotational shaft 148 through a key. The two halves are fastened by two screw bolts 154 and envelope the rotational shaft 148 and the rotational seal ring 170. Accordingly, as has been described, between the rotational seal ring 170 and the two-half rotational holder 178, one end of the thick gasket 175 supports them elastically. The other end of the gasket has the inner face 176 fitted to the rotational shaft 148 and pressed against the rotational shaft 148 and the two-half rotational holder 178 for sealing therebetween.

In the mechanical seal device 200 as a second related art constituted as has been described, when the two-half stationary holder 168 is mounted, two fitting sections must be fitted at the same time. It is therefore required to provide a thick gasket for one of the two fitting sections, that is, at the fitting section at the stationary seal ring 160. Similarly, the gasket 175 has a thick portion between the two-half rotational holder 178 and the rotational seal ring 170.

Accordingly, if the sealed fluid has a high pressure, then the gaskets 165 and 175 are pressed to contact in the radial direction. This causes the mating faces of the two-half type stationary seal ring 160 to be separated and, as a result, the fluid to be sealed will leak outside.

Furthermore, since the gaskets 165 and 175 are deformed due to the pressure of the sealed fluid, the sealing faces 161 and 171 are forced to incline in opposite directions to each other and, as a result, also the fluid to be sealed will leak.

Additionally, although the two-half type stationary and rotational holders 168 and 178 are simplified in the drawing, they have a complicated structure and are difficult to be fabricated, because both must be fitted to the housing 150, the rotational shaft 148 and seal rings 160 and 170, respectively, through the gaskets 165 and 175. Therefore, the cost will be reduced.

The present invention is made in view of the problems described above, and the technical problem to be solved by the invention is to provide a mechanical seal device having a simplified structure and the reduced number of parts or components, as well as cost reduction.

Another technical problem is to provide a mechanical seal device adapted to apply without reduction of sealing ability in the wide range from high to low pressure of the sealed fluid.

Another yet technical problem is to provide a mechanical seal deice for sealing the sealed fluid of high viscosity or high content of slurries, as well as chemical liquid, without any problems with the sealing ability.

SUMMARY OF THE INVENTION

The present invention is made for solving the technical problems described and the technical means for solving the problems are constituted as follows.

The mechanical seal device of a preferred first embodiment according to the invention is a mechanical seal device of outside seal type for sealing the fluid to be sealed between a rotational shaft and a housing through which the rotational shaft passes, comprising: a two-half type stationary seal ring having a first sealing face at one end and retained fluid-tightly by the housing so as to be movable axially; a first two-half type fastening ring fitting to the outer face of the two-half type stationary seal ring and closely contacting the split contact faces of the two-half type stationary seal ring, the first two-half type fastening ring having splitting faces adapted to be engaged and disengaged with each other; a two-half type rotational seal ring having a second sealing face in close contact with the first sealing face and having axially split contact faces, the two-half type rotational seal ring coupling fluid-tightly with the rotational shaft for rotation therewith; and a second two-half type fastening ring fitting to the outer face of the two-half type rotational seal ring and closely contacting the split contact faces of the two-half type rotational seal ring, the second two-half type fastening ring having splitting faces adapted to be engaged and disengaged with each other, wherein a gap through which the sealed fluid passes is defined between the inner face of the two-half type stationary seal ring and the rotational shaft, and wherein the two-half type stationary seal ring is elastically biased against the two-half type rotational seal ring by a biasing means.

In the mechanical seal device of the invention relating to the first embodiment, the two-half type stationary seal ring is so called an outside seal in which the sealed fluid pressure originates on the inner face side and acts outwardly. Furthermore, this mechanical seal device has such a structure that the outer face is secured directly by the two-half type fastening ring or the housing. Therefore, the splitting faces are not forced to be separated to open. Therefore, the fluid of high to low pressure can be sealed.

Also, since the two-half type stationary seal ring has a single component constitution fitting to the two-half type fastening ring for retaining the outer face of the former, the number of parts is minimized, resulting in cost reduction.

Additionally, since the two-half type stationary seal ring has a simplified structure, there is no section to which high viscosity fluid, high slurry contained fluid or chemical liquid as the sealed fluid sticks. This allows the sealing ability to be effectively maintained.

DETAILED DESCRIPTION OF THE INVENTION

Figure 1:
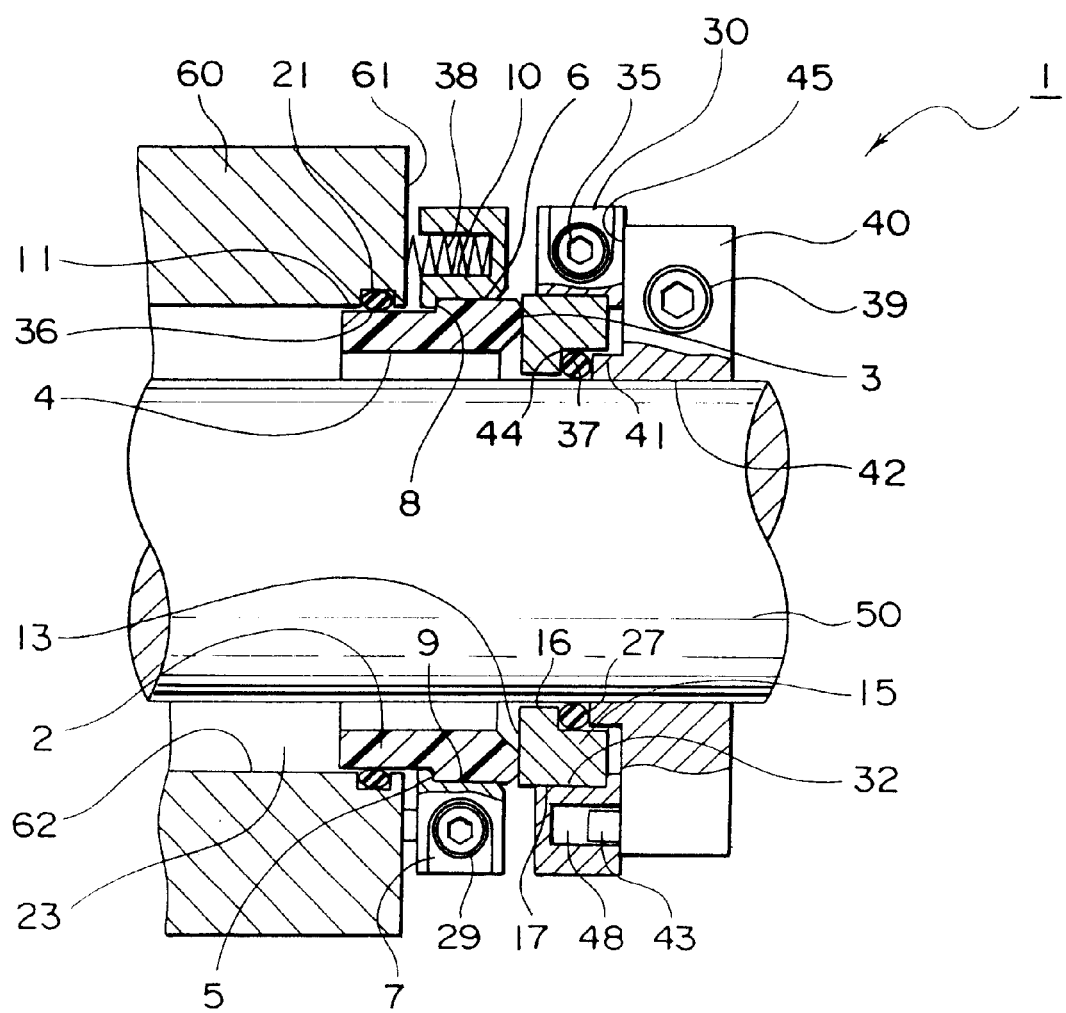
FIG. 1 is a sectional view of a mechanical seal device of a preferred embodiment relating to the invention.

Referring to the drawings, mechanical seal devices of preferred embodiments relating to the invention will hereinafter be described in detail. Each of the drawings is a design drawing prepared in accurate relationship of dimension on the basis of the experiment data.

FIG. 1 is a sectional view of a mechanical seal device of a preferred embodiment relating to the invention.

In FIG. 1, the reference numeral 1 denotes a mechanical seal device that is installed for sealing a flow passage 23 for the sealed fluid between the inner face 62 of a housing 60 and a rotational shaft 50. The flow passage 23 within the housing 60 is formed in communication with the sealed fluid contained therein. In the inner side of the inner face 62 is disposed a rotational shaft 50.

The first outer face 11 of the two-half type stationary seal ring 2 comprising two split halves is movably fitted to the inner face 62 of the housing 60. An annular groove 36 is formed in the inner face 62 for sealing between both parts. A first O-ring 21 of rubber or resin is disposed in the annular groove 36.

The two-half type seal ring 2 is made of silicone carbide or carbon, and the inside diameter of the inner face 4 of the two-half type stationary seal ring 2 is larger than that of the rotational shaft 50. The space defined between the inner face 4 and the rotational shaft 50 is in communication with the flow passage 23. At the end face of the two-half type stationary seal ring 2 is provided a first sealing face 3. The two-half type stationary seal ring 20 is formed with a second outer face 6 on the first sealing face 3 side. The second outer face 6 has a diameter larger than that of the first outer face 11. A first step section 5 is formed at the boundary between the first and second outer faces 11 and 6. The radial surface of the first step section 5 and the first sealing face 3 are processed accurately and in parallel with each other.

A first two-half type fastening ring 7 also comprising two axially split halves is fitted to the outer face of the two-half stationary seal ring 2. The two halves are closely contacted at their splitting faces and coupled together by a plurality of screw bolts 29. Both of first fitting faces 9 as the inner faces of the two halves of the first two-half type fastening ring 7 are fitted to the second outer face 6 and connected to each other to closely contact the splitting faces of the two-half type stationary seal ring 2. Each of the first fitting faces 9 is formed with a second step section 8 that is in turn engaged to the first step section 5. The engagement of the second step section 8 to the first step section 5 permits the first two-half fastening ring 7 to bias the two-half stationary seal ring 2 toward the first seal face 3.

The first two-half fastening ring 7 is formed with one or more sinks 10 each having a spring seat at the bottom end in which a coil spring 38 is inserted to seat thereon. The other end of the coil spring 38 is coupled to and supported by the end face 61 of the housing 60.

The splitting face of the two-half type stationary seal ring 2 is obtained as a surface that is processed through any machining process or as a break surface that is formed by breaking the ring into two segments. The latter or the break surface is advantageous in that the two split segments can always engage under the same conditions as in its original state and are therefore prevented from axially deviating from each other.

A thin rubber film or resin film, for example 0.005 to 0.09 mm thick may be coated on the splitting face. Further, the surface pressure exerted by the first sealing face 3 through the pressure of the sealed fluid applied on the back face opposite to the first sealing face 3 can be increased by making the area of the back face of the two-half type stationary seal ring 2 larger than that of the sealing face 3.

A two-half type rotational seal ring 15 has a L-shaped cross section and comprises two halves that are also split axially. The inner face of the two-half type rotational seal ring 15 includes a contact face 16 and a step face 27. The contact face 16 is fitted to the rotational shaft 50, and a second O-ring 37 of rubber or resin is mounted onto the step face 27. The two-half type rotational seal ring 15 has at one end the second sealing face 13 in contact with the first sealing face 3 of the two-half type stationary seal ring 2 for sealing the sealed fluid.

The two-half type rotational seal ring 15 is made of silicone carbide, carbon or ceramics.

A second two-half type fastening ring 30 fittingly secured to the outer face of the two-half type rotational seal ring 15 comprises two halves each having an axial splitting face. The two halves of the second two-half type fastening ring 30 are coupled in one body by contacting both the splitting faces and fastening them with a plurality of screw bolts 35. The inner face of the second two-half type fastening ring 30 is formed with a step face as a second fitting face 32.

The step face as the second fitting face 32 of the second two-half type fastening ring 30 is fittingly secured to the outer face 17 of the two-half type rotational seal ring 15. In this condition, the two-half type rotational seal ring 15 is fitted such that each corner thereof engages with the step section of the second two-half type fastening ring 30.

In one side face of the second two-half type fastening ring 30 are formed one or more engagement sinks 48 for receiving corresponding drive pins.

On one side face of the second two-half type fastening ring 30, a third two-half type fastening ring 40 is fittingly secured to the rotational shaft 50. The third two-half type fastening ring 40 comprises two axial halves each having a splitting face. The two halves are made to contact with each other at their splitting faces and fastened with a plurality of screw bolts 39. At the same time the two halves are fastened onto the rotational shaft 50 to couple thereto.

An annular projection 41 is provided in the side face of the third two-half type fastening ring 40 for depressing the second O-ring 37. Both side faces of the second and third two-half type fastening rings 30 and 40 are made to contact and as a result, the second two-half type fastening rings 30 and the two-half type rotational seal ring 15 are axially supported. In the side face of the third two-half type fastening rings 40 are press-fitted and fixed one or more drive pins 43 that are mated with the engagement sinks 48 of the second two-half type fastening rings 30, respectively, for rotating the second two-half type fastening rings 30 and the two-half type rotational seal ring 15 as the rotational shaft 50 rotates.

Figure 2:
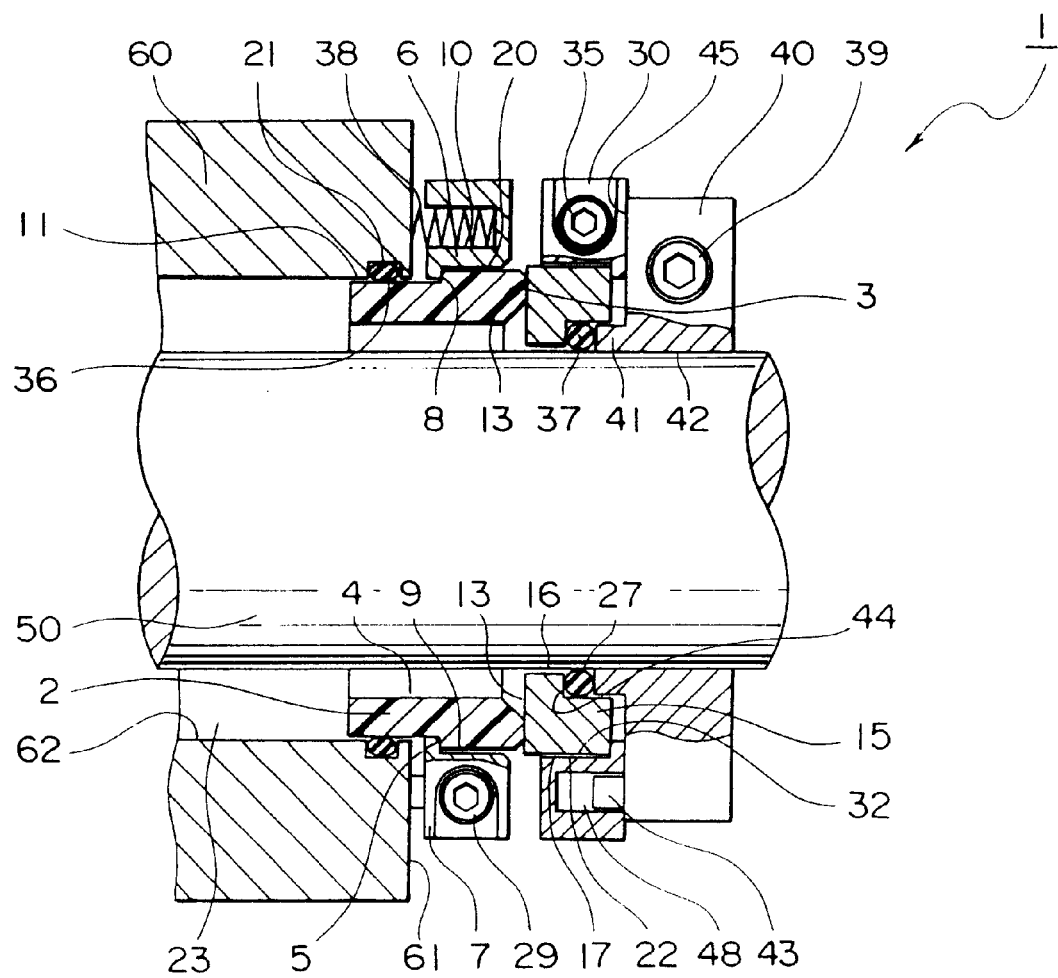
FIG. 2 is a sectional view of a mechanical seal device of a second preferred embodiment relating to the invention.
Figure 3:
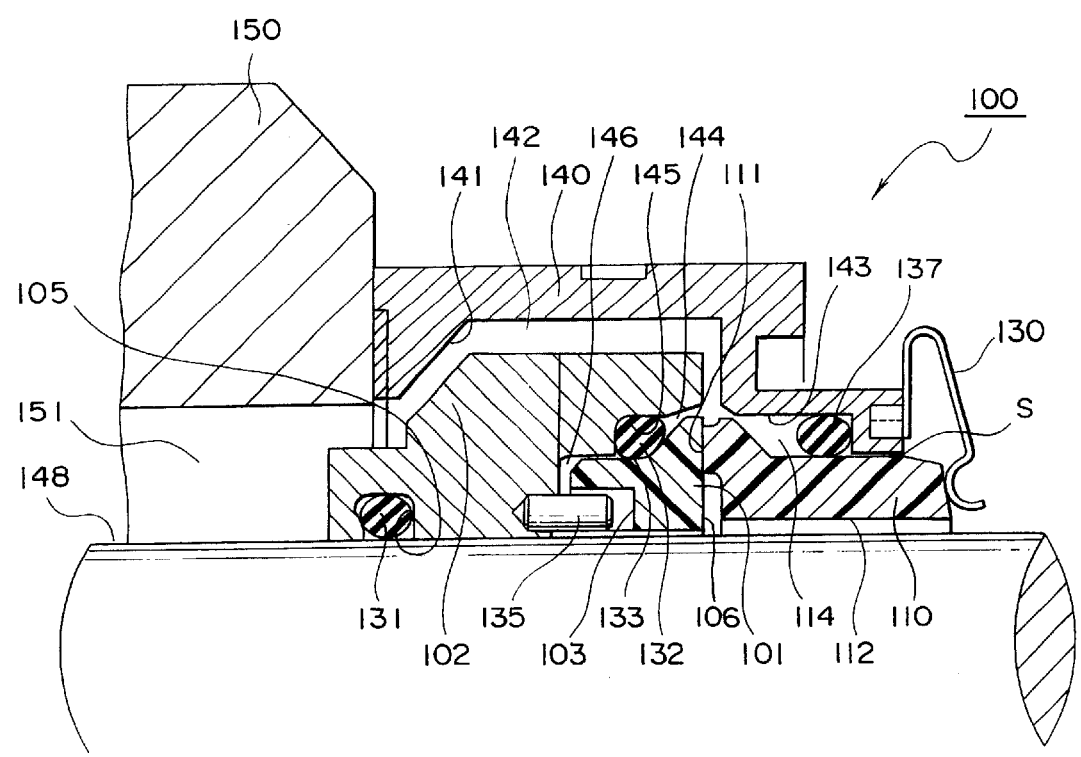
FIG. 3 is a sectional view in half of a first example of the related art.
Figure 4:
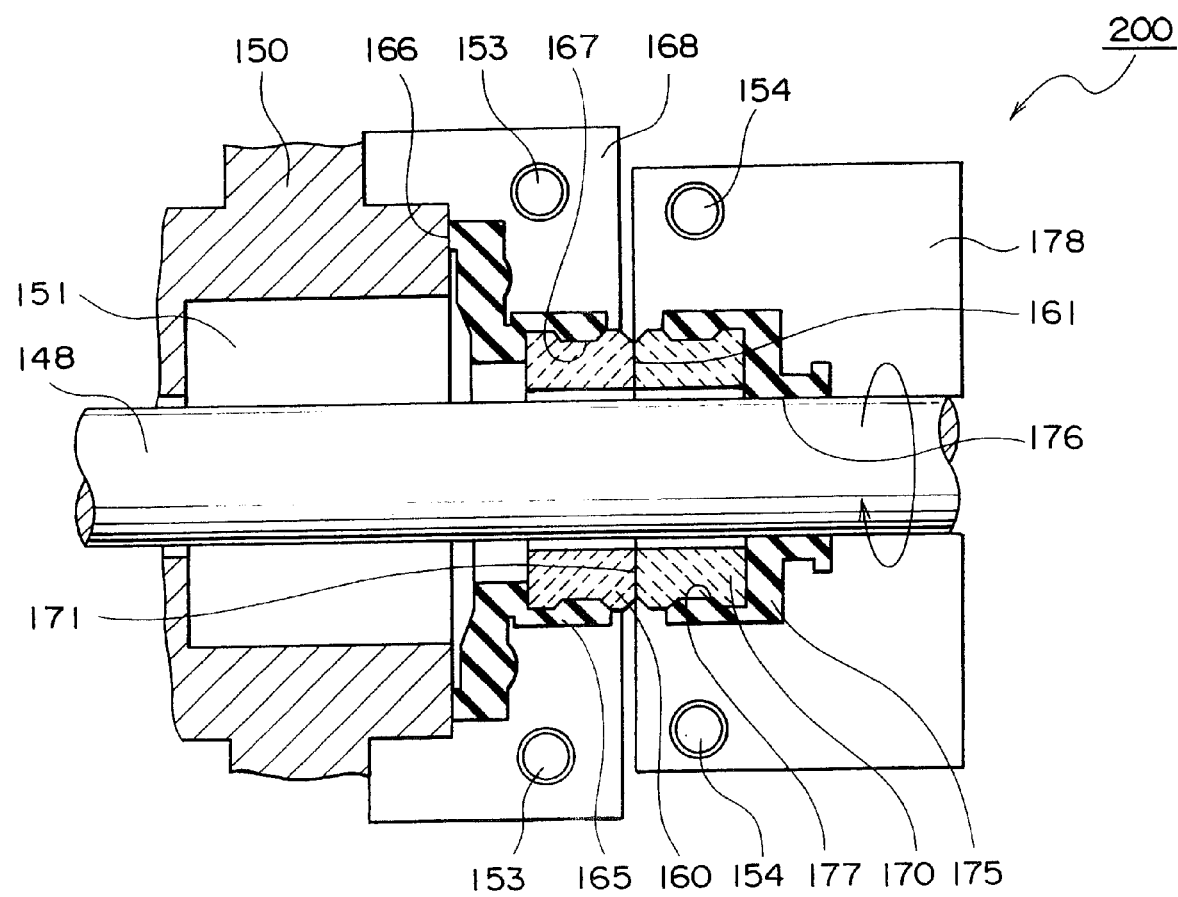
FIG. 4 is a sectional view in half of a second example of the related art.

FIG. 2 is a sectional view of a mechanical seal device of a second preferred embodiment relating to the invention.

The mechanical seal device 1 in FIG. 2 is different from that in FIG. 1 in that a first thin sheet 20 intervenes between the second outer face 6 of the two-half type stationary seal ring 2 and the first fitting face 9 of the first two-half type fastening ring 7. The first sheet 20 is bonded to the second outer face 6 or the first fitting face 9. The first sheet 20 is made of rubber or rein and have a thickness, preferably, between 0.005 to 0.5 mm, and more preferably between 0.01 to 0.1 mm. Excessive thickness of the first sheet 20 affects the flatness of the sealing face. On the contrary, insufficient thickness reduces the shock absorbing effect at the fitting faces of both parts.

Another difference is that a second sheet 22 also intervenes between the outer face 17 of the two-half type rotational seal ring 15 and the second fitting face 32 of the second two-half type fastening ring 30. The second sheet 22 has approximately the same constitution as of the first sheet 20.

In the mechanical seal device 1 constituted as has been described, the sealed fluid within the flow passage 23 is flowed into the inside of the inner face 4 of the two-half type stationary seal ring 2 and then sealed through the close contact of the first sealing face 3 with the second sealing face 13. Accordingly, the structure for sealing is simplified and the sealed fluid having a high pressure can completely be sealed. The sealing ability is also improved since the sealed fluid acts on the back face of the two-half type stationary seal ring 2 and, in cooperation with the pressure of the spring 38, forces the first sealing face 3 to be pressed against the mating face.

Further, the two-half type stationary seal ring 2 has a simple structure in which the first O-ring 21 and the like are not exposed. Accordingly, even if the sealed fluid is a high viscosity fluid, high slurry contained fluid or chemical fluid, the sealing ability can be performed without problems because of the less number of locations, such as a groove where such sealed fluids are apt to stick.

Additionally, since the two-half type stationary seal ring 2 has a structure in which the split contact faces of both halves of the two-half type stationary seal ring 2 are maintained to closely contact with each other by the first two-half type fastening ring 7, the split contact faces are prevented from being separated to open even if the high pressure of the sealed fluid acts on the inner face 4 of the two-half type stationary seal ring 2, and at the same time the first sealing face 3 is also prevented from deforming. As a result, the sealing ability is performed. Furthermore, the first step section 5 is formed in the outer face of the two-half type stationary seal ring 2 and engages with the second step section 8. This is effective to maintain the flatness of the first sealing face 3.

In the constitution in which the first outer face 11 of the two-half type stationary seal ring 2 is movably fitted to the inner face 62 of the housing 60, the constitution of the two-half type stationary seal ring 2 is simplified. As a result, the entire structure of the sealing device also becomes simple.

In addition to the first embodiment described above, other embodiments are now described.

The mechanical seal device 1 of the second embodiment relating to the invention is a mechanical seal device having a sheet member 20 made of rubber or resin between the outer face of the two-half type stationary seal ring 2 and the first two-half type fastening ring 7.

In the mechanical seal device 1 of the invention, relating to the second embodiment, since the two-half type stationary seal ring 2 is fastened with the first two-half type fastening ring 7 through a thin sheet member 20 disposed on the outer face thereof, the first sealing face 3 is not deformed while fastened, and therefore can seal securely. Furthermore, the sheet member 20 may be thin, and the splitting faces are therefore prevented from being separated to open when the pressure of the sealed fluid acts on the inner face 4 of the two-half type stationary seal ring 2. Accordingly, the first sealing face 3 is prevented from being deformed and worn. It is therefore expected to maintain the sealing ability.

The mechanical seal device 1 of the third embodiment relating to the invention is a mechanical seal device in which a first step section 5 is formed in the two-half type stationary seal ring 2; a second step section 8 in engagement with the first step section 5 is formed in the first two-half type fastening ring 7; and the first and second step sections 5 and 8 are forced to engage with each other when the first two-half type fastening ring 7 is biased toward the two-half type rotational seal ring 15 side.

In the mechanical seal device 1 of the invention relating to the third embodiment, since the second step section 8 of the first two-half type fastening ring 7 engages with the first step section 5 of the two-half type stationary seal ring 2 to press the first sealing face 3 against the second sealing face 13 of the two-half type rotational seal ring 15, the first sealing face 3 is not given any step section or deviation between two halves. The sealing ability is therefore sufficiently performed. Additionally, in the adoption of the splitting faces formed by breaking the ring into two segments complimentarily, it is expected to maintain the splitting faces of both segments to be in close contact with each other as in the original state.

The mechanical seal device 1 of the fourth embodiment relating to the invention is a mechanical seal device in which the two-half type stationary seal ring 2 is fitted movably to the inner face 62 of the housing 60 through a seal ring (O-ring 21).

In the mechanical seal device 1 of the invention relating to the fourth embodiment, since the two-half type stationary seal ring 2 is supported such that the outer face 11 thereof is movably fitted to the inner face 62 of the housing 60, any retaining part is not required, and the structure can be extremely simplified. Additionally, since it is allowed for the pressure of the sealed fluid to act on the back face of the two-half type stationary seal ring 2, the sealing face 3 thereof can be securely and closely contacted. Also, an effect to securely and closely contact the splitting faces is provided.

The mechanical seal device 1 of the fifth embodiment relating to the invention is a mechanical seal device in which the biasing means are one or more coil springs 38 that are inserted in sinks, respectively, formed in the two-half type fastening ring 7.

In the mechanical seal device 1 of the invention, relating to the fifth embodiment, since the coil springs 38 are mounted in the sinks of the first two-half type fastening ring 7 outside of the sealed fluid, even the sealed fluid, such as high viscosity fluid and high slurry contained fluid can be prevented from sticking on the coil springs 38.

According to the mechanical seal devices 1 of the preferred embodiments relating to the invention, following effects are provided.

According to the mechanical seal device 1 of the preferred first embodiment relating to the invention, an effect is provided, in which as the two-half type stationary seal ring 2 is retained at its outer face 11 directly by the two-half type fastening ring 7, the splitting faces are not forced to be separated to open and this allows to seal the fluid of high to low pressure.

Also, another effect is also provided, in which as the two-half type stationary seal ring 2 has a single component structure fitting to the two-half type fastening ring 7 for retaining the outer face 11 of the former, the number of required parts can be minimized, resulting in cost reduction.

Additionally, another yet effect is provided in which since the two-half type stationary seal ring 2 has a simplified structure, there is no section to which the sealed fluid having high viscosity and high slurry contained will stick. This allows the sealing ability to be effectively performed.

According to the mechanical seal device 1 of the second embodiment relating to the invention, an effect is provided in which since the two-half type stationary seal ring 2 is fastened with the first two-half type fastening ring 7 through a thin sheet member 20 disposed on the outer face 11 thereof, the first sealing face 3 is not deformed while fastened, and therefore seals securely. Furthermore, since the sheet member 20 may be thin and the splitting faces are therefore prevented from being separated to open when the pressure of the sealed fluid acts on the inner face 4 of the two-half type stationary seal ring 2, the sealing ability is improved. Accordingly, the first sealing face 3 is prevented from being deformed and worn. An effect to maintain the sealing ability is therefore expected.

According to the mechanical seal device 1 of the third embodiment relating to the invention, since the second step section 8 of the first two-half type fastening ring 7 engages with the first step section 5 of the two-half type stationary seal ring 2 to press the first sealing face 3 against the sealing face 13 of the two-half type rotational seal ring 15, the first sealing face 3 is not given any step section or deviation between two halves. The sealing ability is therefore sufficiently performed. Additionally, in the adoption of splitting faces formed by breaking the ring into two segments complimentarily, an effect to maintain the splitting faces of both segments to be in close contact with each other as in the original state is expected.

According to the mechanical seal device 1 of the fourth embodiment relating to the invention, since the two-half type stationary seal ring 2 is supported such that the outer face 11 thereof is movably fitted to the inner face 62 of the housing 60, any retaining part is not required and the structure can be extremely simplified. Additionally, since it is allowed for the pressure of the sealed fluid to act on the back face of the two-half type stationary seal ring 2, the sealing face 3 thereof can securely and closely contact. Also, an effect to securely and closely contact the splitting faces of the two-half type stationary seal ring 2 is expected.

According to the mechanical seal device 1 of the fifth first embodiment relating to the invention, since the coil springs 38 are mounted in the sinks of the first two-half type fastening ring 7 outside of the sealed fluid, even the sealed fluid, such as high viscosity fluid and high slurry contained fluid is prevented from sticking on the coil springs 38. Accordingly, an effect to always maintain the contact pressure to be applied to the sealing face.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments.

The technical scope of the invention is specified by the claims.

What is claimed is:

1. A mechanical seal device for sealing a fluid to be sealed between a rotational shaft and a housing through which said rotational shaft passes, comprising: a two-half stationary seal ring having a first sealing face at one end and retained fluid-tightly by said housing so as to be movable axially; a first two-half fastening ring fitting to the outer face of said two-half stationary seal ring and closely contacting split contact faces of said two-half stationary seal ring, said first two-half fastening ring having splitting faces adapted to be engaged and disengaged with each other; a two-half rotational seal ring having a second sealing face in close contact with said first sealing face and having axially split contact faces, said two-half rotational seal ring coupling fluid-tightly with said rotational shaft for rotation therewith; and a second two-half fastening ring fitting to the outer face of said two-half rotational seal ring and closely contacting the split contact faces of said two-half rotational seal ring, said second two-half fastening ring having splitting faces adapted to be engaged and disengaged with each other, wherein a gap through which the sealed fluid passes is defined between the inner face of said two-half stationary seal ring and said rotational shaft, and wherein said two-half stationary seal ring is elastically biased against said two-half rotational seal ring by a biasing means.

2. The mechanical seal device according to claim 1, further comprising a sheet member made of rubber or resin between the outer face of said two-half stationary seal ring and said first two-half fastening ring.

3. The mechanical seal device according to claim 1, wherein a first step section is formed in said two-half stationary seal ring; a second step section in engagement with the first step section is formed in said first two-half fastening ring; and said first and second step sections are forced to engage with each other when said first two-half fastening ring is biased toward said two-half rotational seal ring.

4. The mechanical seal device according to claim 1, wherein said two-half stationary seal ring is fitted movably to the inner face of said housing through a seal ring.

5. The mechanical seal device according to claim 1, wherein said biasing means are one or more coil springs that are inserted in sinks, respectively, formed in said first two-half fastening ring.

* * * * *